United States Patent
Lucero

[15] 3,684,030
[45] Aug. 15, 1972

[54] APPARATUS FOR LAYING CABLE AND THE LIKE

[72] Inventor: Frank Lucero, Denver, Colo.
[73] Assignee: Lee Way Trenching, Inc., Denver, Colo.
[22] Filed: June 1, 1970
[21] Appl. No.: 42,233

[52] U.S. Cl. ................172/700, 172/766, 61/72.5, 37/193, 172/444
[51] Int. Cl. .....................A01b 13/08, B63b 35/04
[58] Field of Search......172/699, 703, 766, 694, 388, 172/720, 196; 61/72.1, 72.3–72.6; 37/193

[56] References Cited

UNITED STATES PATENTS

| | | | |
|---|---|---|---|
| 743,176 | 11/1903 | Luquire | 172/699 |
| 1,287,291 | 12/1918 | Gordon | 172/699 X |
| 2,569,556 | 10/1951 | Collins et al. | 172/699 |
| 2,787,202 | 4/1957 | Gladis | 172/699 X |
| 2,842,077 | 7/1955 | Morrison | 37/193 X |

FOREIGN PATENTS OR APPLICATIONS

| 904,577 | 11/1945 | France | 172/700 |
|---|---|---|---|

*Primary Examiner*—Robert E. Pulfrey
*Assistant Examiner*—Stephen C. Pellegrino
*Attorney*—Reilly and Lewis

[57] ABSTRACT

Apparatus for laying cable and the like includes a trenching plow and a cable dispenser carried by a vertically adjustable support frame attachable to a self-propelled vehicle. The trenching plow includes a relatively flat blade body surmounted with an upper, forwardly projecting pivot arm for pivotal movement between operative and retracted positions. The blade has one or more vertically spaced forwardly and downwardly projecting teeth with each successively lower blade tooth being rearwardly and downwardly stepped relative to the one above. Each blade tooth has a front cutting edge and relatively narrow elongated lateral blade sections projecting outwardly from opposite sides of the blade body, the lateral blade sections being arranged with top and bottom faces on a front segment which progressively increases in slope along a curve extending rearwardly of a forward cutting edge and a rear segment extends rearwardly on a straight incline to provide a clearance angle under the blade sections to reduce drag and pull the vehicle down against the soil to increase traction while progressively lifting the soil vertically. One or more cables are laid in a trench formed by the trenching plow by the cable dispenser having a hinged side wall for lateral insertion of the cable.

10 Claims, 10 Drawing Figures

PATENTED AUG 15 1972 3,684,030

INVENTOR
FRANK LUCERO
BY
*Reilly and Lewis*
ATTORNEYS

PATENTED AUG 15 1972 3,684,030

APPARATUS FOR LAYING CABLE AND THE LIKE

This invention relates to novel and improved apparatus for continuously digging a trench and laying cable therein in a rapid, dependable manner.

There are a variety of applications in which electrical cable, pipe and the like are buried in the earth. In the past a variety of plows and cable dispensers have been mounted on self-propelled vehicles to form a trench for dispensing cable from a roll in a continuous operation. The usual practice has been to employ a somewhat conventional plow or plow share having V-shaped or sloped side edges and a flat bottom which tend to force the soil outwardly at an angle and to create a substantial amount of drag on the plow thereby making it difficult to advance, particularly through hard ground.

Accordingly it is an object of this invention to provide an improved trenching plow for cable-laying apparatus which provides efficient earth penetration through a range of selected depths with a minimum of drag.

Another object of this invention is to provide improved blade structure for a trenching plow utilizing one or more forwardly projecting blade teeth arranged in rearwardly stepped relation.

A further object of this invention is to provide a power-driven attachment apparatus for laying cable and the like adapted to be supported on a self-propelled vehicle which may be readily moved between an extended operating position whereby it penetrates to a selected depth in the earth and a retracted, transport position in which it can be carried above the ground to a selected job site.

Yet a further object of this invention is to provide novel apparatus for accurately placing one or more cables, pipe or the like to a selected depth in the earth, which is principally characterized by a trenching plow blade having one or more forwardly and downwardly projecting teeth with laterally projecting top and bottom faces arranged to establish maximum soil lift with minimum blade drag together with improved vehicle traction.

In accordance with the present invention in a preferred embodiment there is provided a vertically adjustable, parallelogram-type support frame which attaches to the end of a self-propelled vehicle and carries a trenching plow and a cable dispenser. The frame has forwardly and upwardly inclined upper support members at an angle to neutralize the blade angle. The trenching plow includes a blade with one or more teeth which are rearwardly and downwardly stepped relative to one another so that each succeeding lower tooth makes yet a deeper cavity and is surmounted with a pivot arm. Each blade tooth has a forward beveled cutting edge and a relatively narrow elongated lateral blade section projecting outwardly from the sides of the blade body with a front segment of each blade section being arranged along a curved line which progressively increase in slope rearwardly of the forwardly extending toe-like portions of the blade body and a rear segment which is on a straight incline to provide a blade angle which produces a direct lifting force on the soil, provides a clearance angle under the blade sections to reduce blade drag and is effective to pull the vehicle down to increase traction. A cable dispenser rearwardly of the plow has a housing with laterally projecting side sections and a hinged side wall for lateral insertion of the cable thereinto together with pairs of rollers arranged along the downwardly and rearwardly extending housing to dispense one or more cables into the trench being formed by the trenching plow.

Other objects, advantages and capabilities of the present invention will become more apparent as the description proceeds, taken in conjunction with the accompanying drawings, in which.

Figure 1:
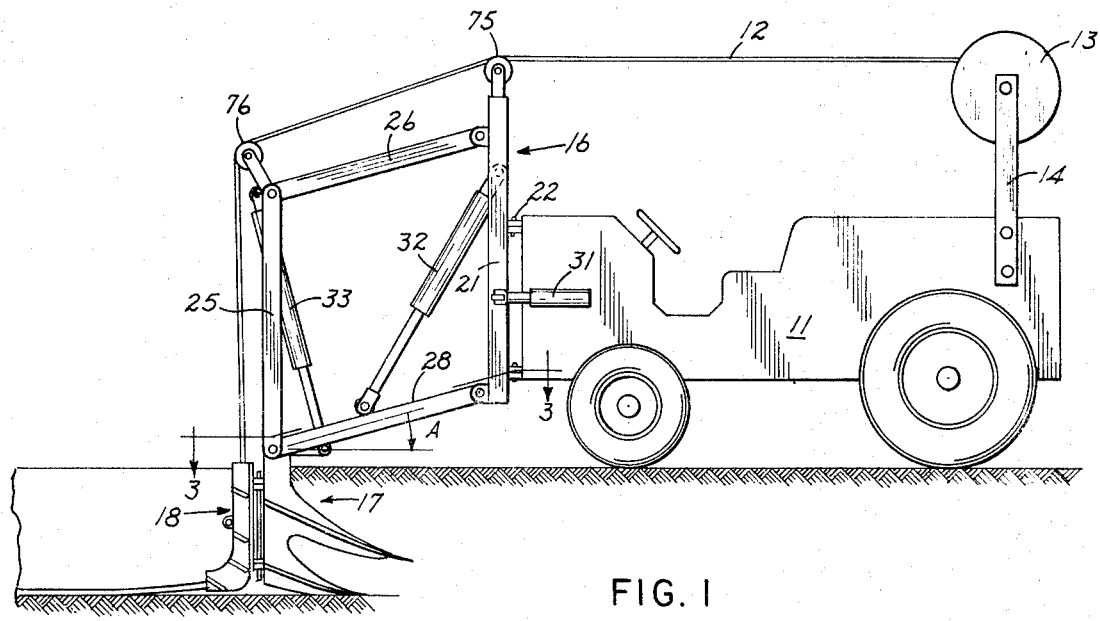
FIG. 1 is a side elevation view of cable-laying apparatus embodying features of the present invention mounted on a self-propelled vehicle and shown in an operative earth-penetrating position.
Figure 2:
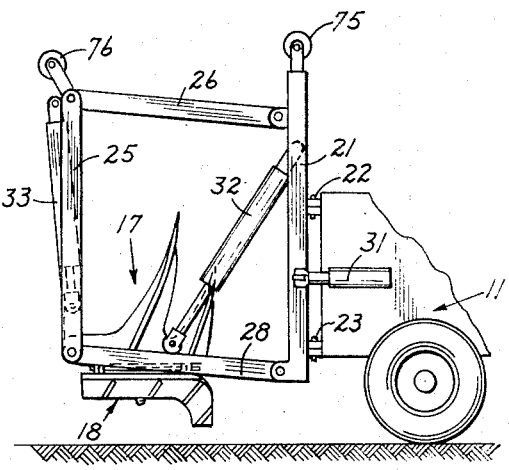
FIG. 2 is a fragmentary side elevation view of the cable-laying apparatus of FIG. 1 with the plow and cable dispenser assembly disposed in a retracted position.

Referring now to the drawings, FIG. 1 shows a preferred embodiment of apparatus for laying cable, pipe and the like in accordance with the present invention mounted at the end of a self-propelled vehicle 11. Cable 12 laid by the apparatus is shown as being wound on a drum 13 supported for rotation above the vehicle on a pair of upright supports 14. While reference is being made to the laying of cable, it is understood that the present invention is suitable for other forms of conduit such as pipe and the like for transporting fluids. Briefly, the apparatus shown comprises a vertically adjustable support frame 16 hingedly secured to the end of the vehicle 11 on which there is carried a trenching plow 17 and a cable dispenser 18. This plow and dispenser assembly is supported in either an extended, earth-penetrating position as shown in FIG. 1 or in a retracted position elevated above the earth's surface for transport on the vehicle to various job sites as shown in FIG. 2.

The support frame 16 is of an open parallelogram-type construction having an inner upright support member 21 hinged or swiveled to the end of the vehicle 11 for swinging movement of the support frame about a vertical axis from side to side in the horizontal. The support frame swivels about a vertical axis so that the trenching plow can follow the vehicle 11 and have freedom in turning. The hinged connection shown between member 21 and vehicle 11 is provided by upper and lower hinges represented at 22 and 23, respectively. Included in the support frame 16 is a pair of outer, upright support members 24 and 25 parallel to one another and which in turn are spaced from and parallel to the inner upright support member 21. Support members 24 and 25 are pivotally connected at their opposite ends to an upper rearwardly extending support member 26, and a pair of laterally spaced, lower rearwardly extending support members 27 and 28, respectively, the lower support members 27 and 28 being held in a spaced parallel relation to the upper support member 26 with the forward ends of the upper and lower support members being pivoted to rearwardly extending ear projections 21a. A particular advantage of the support frame 16 shown is that it may also serve as the support for a back-fill blade disposed above and rearwardly of the trenching plow to cover the buried cable.

The motive power for the operation of the apparatus carried on the support frame includes a power cylinder 31 operatively connected between a side of the vehicle and the inner upright support member 21 which serves to swing the support frame 16 from side to side in the horizontal. A second power cylinder 32 is pivotally connected between the inner upright support member 21 and to ear extensions 27a and 28a on the tops of lower rearwardly extending support members 27 and 28, respectively, and cylinder 32, cylinder 32 being inclined at an approximately 45° angle to the horizontal and serves to raise and lower the rearwardly extending and upright support members of the support frame 16 to adjust the elevation of the plow and dispenser. Yet a third power cylinder 33 is pivotally connected at an upper pivot just outwardly of the upper ends of the outer support members 24 and 25 and a lower pivot at the forward upper end of the trenching plow arm 34, hereinafter described, and serves to pivot the trenching plow and associated cable dispenser 18 between the operative position of FIG. 1 and the retracted position of FIG. 2. These power cylinders preferably are hydraulic but it is understood other forms of motive power or drives such as air cylinders may be used.

Figure 4:
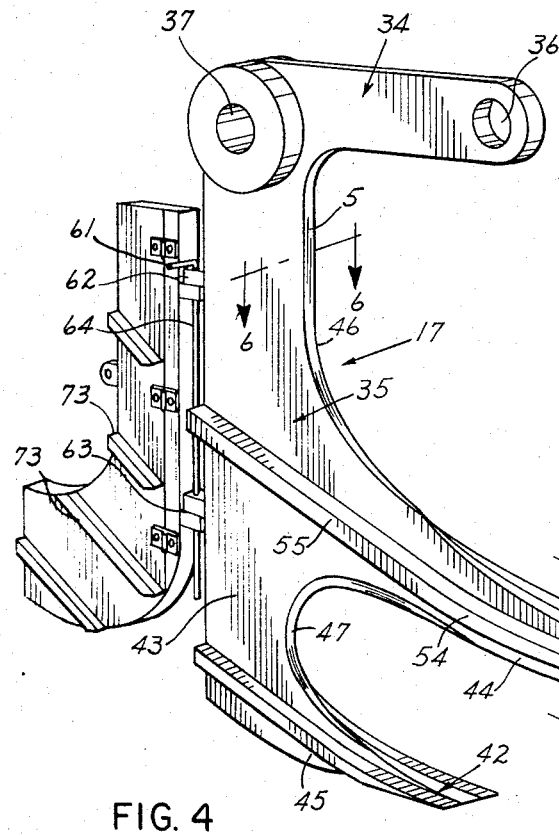
FIG. 4 is a perspective view of the plow and cable dispenser assembly of the apparatus shown in FIGS. 1-3.
Figure 5:
FIG. 5 is a sectional view taken along lines 5—5 of FIG. 4.
Figure 6:
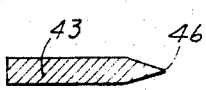
FIG. 6 is a sectional view taken along lines 6—6 of FIG. 4.
Figure 3:
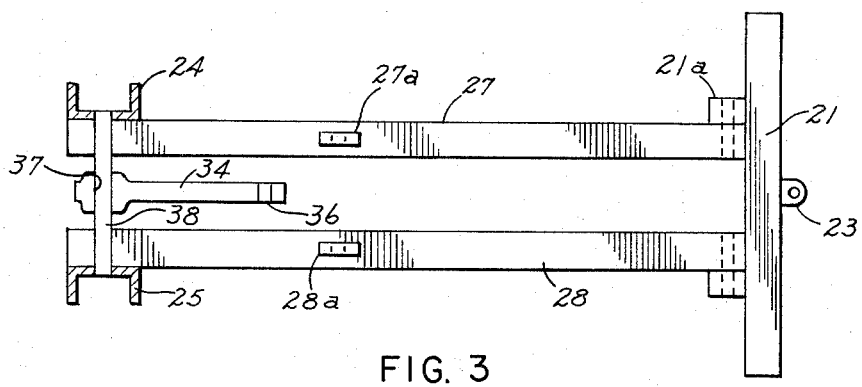
FIG. 3 is a sectional view through the support frame taken along lines 3—3 of FIG. 1.

The trenching plow 16 includes the upper forwardly projecting pivot arm 34 surmounted on a relatively flat earth-penetrating blade 35. The pivot arm 34 is provided with a forward aperture or eye 36 which is pivotally connected to the lower end of the piston of power cylinder 32 and a rear aperture or eye 37 having an enlarged width through which a rear pivot shaft 38 extends, the shaft 38 being supported at the adjacent end portions of support members 24 and 27 on one side of the frame and the adjacent end portions of support members 25 and 28 on the other side of the frame, as best seen in FIG. 4. In this way the movement of the pivot piston portion of cylinder 33 and the swinging motion of cylinder 33 about its upper pivot causes pivot arm 34 to swing about the rear pivot shaft 38 between horizontal and vertical positions to move the blade 35 between the operative position shown in FIG. 1 and the retracted position shown in FIG. 2 and change the effective angle of the blade teeth described hereinafter as required.

In the earth-penetrating operative position, the lower support members 27 and 28 extend on a forward and upward incline relative to the horizontal, as represented at an angle A which applies a vertical as well as a horizontal component of force to the blade at pivot shaft 38 and this angle may be selected so as to neutralize the effect of the forward and downward angle of the blade sections so that the blade tends to remain at a given depth. While angle A shown is on the order of 15° this may vary from approximately 15° to 40° and an angle A of 37.6° has been found to be particularly effective.

The blade 35, in general, has upper and lower diger teeth 41 and 42 projecting forwardly and downwardly from a flat-sided blade body represented at 43 located below the pivot arm 34 and integral therewith with the lower digger tooth 42 being rearwardly and downwardly stepped from the upper digger tooth 41. The blade body 43 is shaped with forwardly converging, upper and lower toe-like projections 44 and 45. An upper, vertical, beveled cutting edge 46 above the upper toe-like projection 44 and a lower, vertical beveled cutting edge 47 between the upper and lower toe-like portions 44 and 45 are formed on the front of the blade body so that the blade makes a sharp, relatively narrow cut in the earth as it is moved therethrough.

Figure 7:
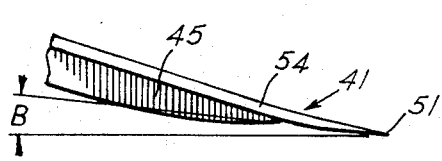
FIG. 7 is an enlarged fragmentary side elevation view of the upper blade tooth shown in FIG. 4.

Each of the forwardly projecting digger teeth is of a similar construction and each has a forward laterally extending cutting edge 51 disposed forwardly of the associated toe-like support projections. Relatively narrow, elongated lateral blade sections 52 and 53 project outwardly from opposite sides of the blade body 43. Each of the blade sections includes a curved segment represented at 54 extending rearwardly from the cutting edge 51 which progressively increases in slope in the rearward direction. These laterally extending blade sections also include a straight inclined rear segment represented at 55 which terminates at the back of the blade. The forwardly and downwardly inclined angle which these blade sections make with the horizontal is the blade angle. As best shown in FIG. 7, the bottom of the toe-like support projection of the tooth terminates rearwardly of the beveled cutting edge and there is a clearance between a horizontal line through the tip of the cutting edge and the bottom of the toe-like support projection measured along a slight angle B as shown in FIG. 7 and it has been found that this clearance angle should be 6° or more for each tooth.

This above-described blade tooth structure with rearwardly and upwardly inclined, laterally extending blade sections initially engages the earth at a very slight forward and downward incline for maximum leverage and then, as the ground begins to break, the incline progresses upwardly to continue the lifting force on the soil. The forward top face of the tooth at its forward tip is almost flat and the lateral blade sections then gradually increase from an angle of 12° to 20° along a gradual curve to a point approximately midway between their forward and rear ends. The effect of having this configuration of the blade tooth on the soil is to lift the soil directly upwardly rather than wedge it outwardly to the side and a result is that the wheels of the vehicle are pulled down as the blade enters the ground to increase traction. By properly selecting angle A and the blade angle the vertical components of force are offset so that the blade tends to travel at a given depth and requires less pulling force. The relative sharpness of the blade teeth and the flat nature of the blade permit the plow to penetrate harder ground including frozen ground. The effective angle for the side blade sections is usually measured when the blade body is vertical as shown, but it is apparent that the effective angle of the teeth and blade sections 52 and 53 may be decreased by pivoting the blade forwardly by means of cylinder 33 if certain trenching applications so require. The other feature of the above-described blade tooth structure is that the bottom face of the lateral blade sections, which for the most part is parallel to the top face, also extends along the same rearwardly progressively increasing incline and the incline is straight at the rear. This arrangement for the bottom face of the blade sections provides a blade clearance angle which tends to provide relief for the blade and prevents accumulation of soil between upper and lower sections since it is always moved upwardly and rearwardly and thereby reduces drag. In the digging action, each successively lower and rearwardly stepped blade tooth employs the same digging action to make a yet deeper trench.

Figure 8:
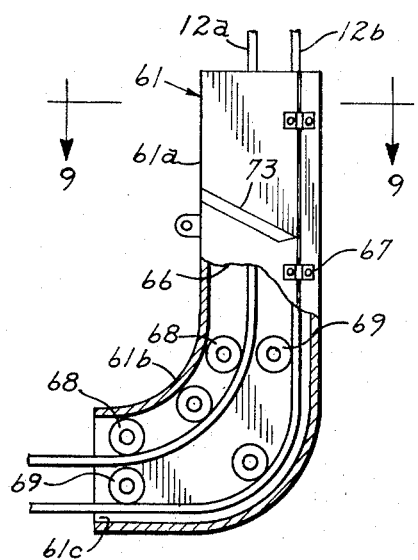
FIG. 8 is a side elevation view of the cable dispenser shown in FIG. 4 with a portion of the hinged side wall broken away to show interior parts.

The cable dispenser 18 includes an elongated housing 61 hingedly mounted on the back of the blade to swing from side to side. The hinging structure shown for the housing includes upper and lower cooperative ear pairs represented at 62 and 63 carried by the blade and housing, respectively, with each ear pair having alignable apertures through which a removable pivot rod 64 is inserted so as to releasably and hingedly attach the housing to the back of the blade 35. The housing 61 is shaped with an upright portion 61a with a top cable inlet opening, a sharp intermediate bend 61b and a rearwardly extending lower portion 61c with a bottom cable outlet opening. One side wall 66 of the housing is hinged to the forward wall to laterally swing open to permit the insertion of cable laterally into the housing. A latch 66a engages the outer surface of section 61a to releasably hold the hinged wall 66 closed. A plurality of spaced hinges 67 are shown pivotally connecting the side wall to the front of the housing. The cable dispenser 18 shown is suitable for simultaneously handling two separate cable strands or cables represented at 12a and 12b in FIGS. 8 and 9. For this dual cable arrangement there is provided a series of spaced pairs of guide rollers 68 and 69 along opposite sides of the housing with each pair of guide rollers being sufficiently spaced apart to pass cable 12a between the spaced sets with the sets other cable 12b extending between the rollers and a wall portion of the housing adjacent rollers 69.

Vertically spaced, lateral blade sections 73 are provided on each side of the cable housing with a beveled front edge. These blade sections are arranged as rearwardly and upwardly inclined extensions of the lateral blade sections on the trenching plow blade and serve to lift the soil in the same action as the plow and dispenser assembly are moved through the formed trench. These side sections also serve to keep the cable dispenser housing at the bottom of the trench and keep the soil moving up. The cable 12 from the drum is shown to be reefed over the front and rear pulleys 75 and 76 mounted on top of the support frame to direct it into the top opening of the dispenser housing.

Figure 9:
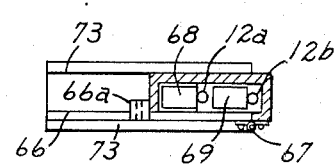
FIG. 9 is a sectional view taken along lines 9—9 of FIG. 8.
Figure 10:
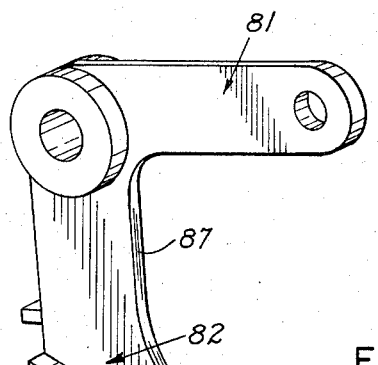
FIG. 10 is a perspective view of a three-tooth form of trenching plow.

The other form of trenching plow shown in FIG. 9 is generally similar in construction to that above described and has a pivot arm 81 surmounted on the blade 82 and blade 82 has three forwardly and downwardly projecting teeth 84, 85 and 86 arranged in downwardly and rearwardly stepped relation to the one above. Again, the blade has a vertical cutting edge 87 above the top blade tooth 84 and vertical cutting edges 88 and 89 between teeth 84 and 85 and between teeth 85 and 86, respectively. These teeth again include lateral blade extensions 90 and 92 on each side of the flat blade body 91 with one segment progressively increasing in slope rearwardly along a curve and a rear straight segment which terminates at the back of the blade body to provide the direct lifting action and a minimum of drag against the soil and pulls the vehicle down to increase traction with each succeeding lower blade tooth trailing the next above blade together to make a successively deeper cut.

Although the present invention has been described with a certain degree of particularity, it is understood that the present disclosure has been made by way of example and that changes in details of structure may be made without departing from the spirit thereof.

What is claimed is:

1. In a trenching plow adapted for attachment to a vehicle to form a trench in the earth, the combination comprising an earth-penetrating, generally flat-sided blade body with opposed flat side faces having a dependent shank portion and having at least one forwardly and downwardly extending tooth portion integral with said shank portion and terminating in a forward cutting edge, and lateral blade sections with top and bottom faces extending laterally outwardly from the side faces of said blade body and extending along the side faces of said tooth portion on a rearward and upward incline beginning at said forward cutting edge to elevate the soil as the blade tooth and lateral blade sections penetrate the earth and pull the vehicle down to increase traction.

2. In a trenching plow as set forth in claim 1 including a forwardly extending attachment bar surmounted on the blade body at the upper end of the shank portion having pivot portions at forward and rear ends of the bar and means associated with said pivot portions for swinging the blade between a generally vertical earth-penetrating position to a generally horizontal retracted position above the earth.

3. In a trenching plow as set forth in claim 1 wherein said lateral blade sections extend to the back of said blade body, said toe portion extending below the bottom face of said blade sections.

4. In a trenching plow as set forth in claim 1 wherein said top and bottom faces of said lateral blade sections are generally parallel to one another along the sides of the blade body.

5. In a trenching plow as set forth in claim 1 wherein said blade body has a forwardly converging toe-like support portion for supporting said lateral blade sections on each side face thereof.

6. In a trenching plow as set forth in claim 5 wherein said toe-like support portion is disposed above a horizontal line through the cutting edge on an angle of at least 6°.

7. In a trenching plow as set forth in claim 1 including a plurality of vertically spaced blade teeth with each lower of said plurality of blade teeth being rearwardly stepped relative to a blade tooth above.

8. In a trenching plow as set forth in claim 1 wherein each of said blade sections include a forward segment arranged along a curved line which progressively increases in slope rearwardly from the forward cutting edge and a rear segment arranged along a straight line rearward and upward incline.

9. In a trenching plow as set forth in claim 8 wherein said forward curved segment increases in slope rearwardly and upwardly on an incline from about 12° to 20°.

10. A trenching plow adapted for attachment to a vehicle to form a trench in the earth comprising an earth-penetrating blade body with relatively flat side faces and having a depending shank portion and a plurality of vertically spaced blade tooth portions integral with said shank portion projecting forwardly and downwardly from the shank portion with each succeeding lower blade tooth portion being rearwardly stepped from the next above blade tooth portion, each said tooth portion terminating in a forward cutting edge and having rearwardly and upwardly inclined lateral blade sections projecting outwardly from opposite sides of each tooth portion and said side faces of said blade body to penetrate and lift the soil and pull the vehicle down to increase traction as the blade body is moved forwardly therethrough.

* * * * *